United States Patent [19]

Quedens

[11] 4,362,381
[45] Dec. 7, 1982

[54] MULTIFORMAT FILM CASSETTE TRANSPORT

[75] Inventor: Phillipp J. Quedens, Berlin, Conn.

[73] Assignee: SmithKline Instruments, Inc., South Windsor, Conn.

[21] Appl. No.: 134,517

[22] Filed: Mar. 27, 1980

[51] Int. Cl.³ .............................................. G03B 27/44
[52] U.S. Cl. ..................................... 355/54; 108/137
[58] Field of Search ...................... 355/53, 54; 108/137

[56] References Cited

U.S. PATENT DOCUMENTS

| | | | |
|---|---|---|---|
| 3,601,487 | 8/1971 | Burton et al. .......................... | 355/53 |
| 3,639,059 | 2/1972 | Strumor et al. .................. | 355/53 X |
| 3,746,444 | 7/1973 | Kahle et al. ...................... | 355/54 X |
| 3,909,836 | 9/1975 | Vane .................................. | 355/53 X |
| 4,247,197 | 1/1981 | Oosaka et al. ........................ | 355/54 |

Primary Examiner—Richard A. Wintercorn
Attorney, Agent, or Firm—Fishman and Van Kirk

[57] ABSTRACT

A sheet of film, for use in recording the results of non-invasive medical tests, is indexed relative to a lens and shutter assembly to permit the serial formation of multiple images on the film. The indexing is accomplished through the use of a transport mechanism which may be independently moved in two mutually transverse directions.

11 Claims, 4 Drawing Figures

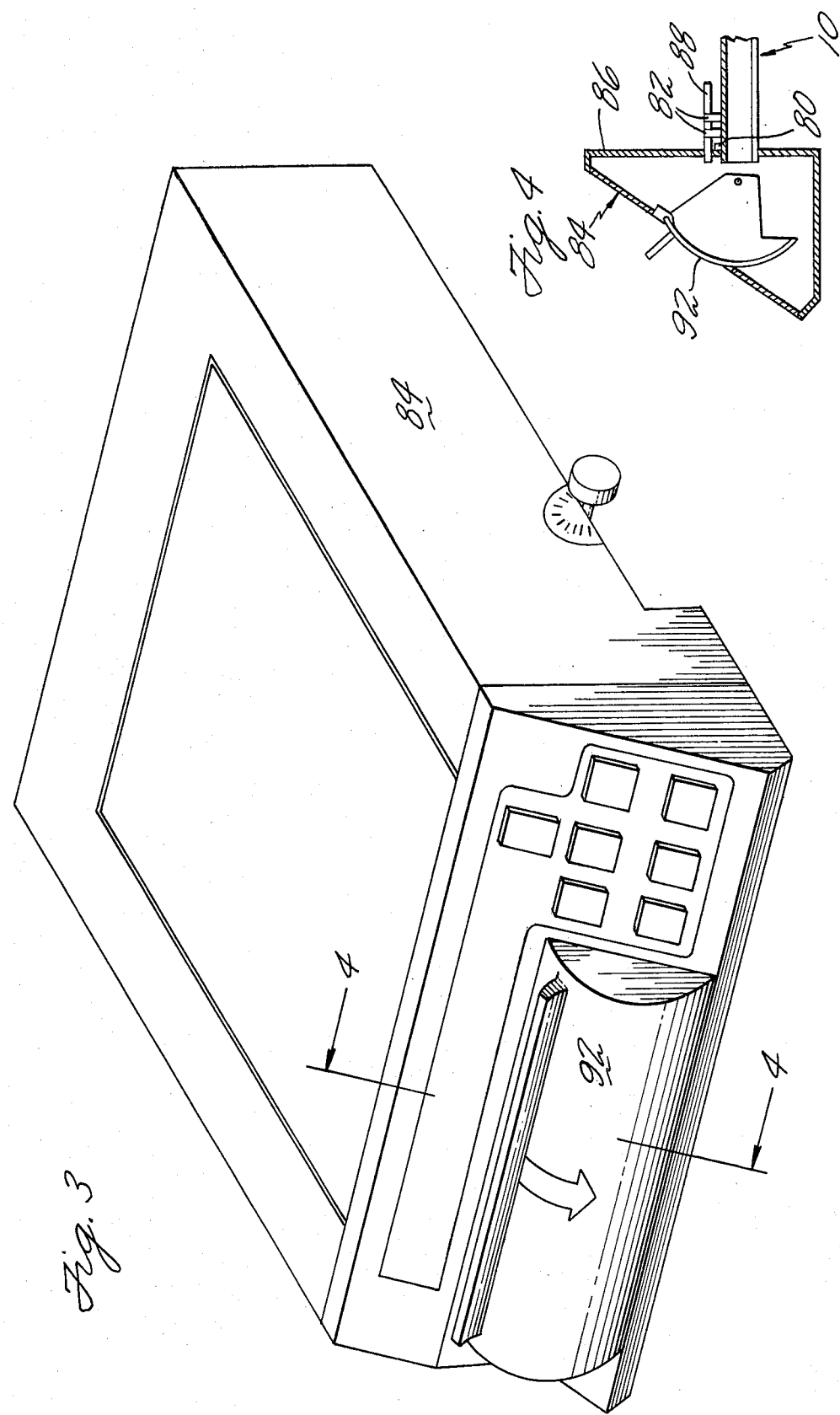

MULTIFORMAT FILM CASSETTE TRANSPORT

BACKGROUND OF THE INVENTION (1) Field of the Invention

The present invention relates to the recording of information, especially medical information, and particularly to a photographic storage technique. More specifically, this invention is directed to apparatus for use in recording multiple images on a single carrier sheet. Accordingly, the general objects of the present invention are to provide novel and improved methods and apparatus of such character.

(2) Description of the Prior Art

While not limited thereto in its utility, the present invention is particularly well suited for use in the storage of data produced during diagnostic tests and especially to recording the results of non-invasive test procedures performed on the human body. For reasons which are well known, and will not be discussed herein, the film negatives or other hard copy records produced during medical test procedures must be stored for a considerable period of time. The space required for such storage is very considerable and thus maintenance of these records constitutes a substantial expense. Additionally, when photographic film is the storage medium, the salvage value of the stored material is significant because of the silver content. There has, accordingly, been a long standing desire to reduce the volume of medical records being stored.

Continuing to discuss non-invasive medical test procedures, one of the more recently refined testing techniques employs the use of ultasonic energy. Reference may be had to U.S. Pat. No. 4,137,777, assigned to the assignee of the present invention, for a disclosure of an ultrasonic body scanner. During use of the ultrasonic body scanner, and this is also true of other types of medical test apparatus, a plurality of images are sequentially presented for analysis by the physician. It is often necessary or desirable that these sequential images be permanently recorded; i.e., be photographed; for analysis after the test procedure has been terminated and/or for future use. Thus, by way of example, the physician may wish to photograph images sequentially provided on an active display device, a cathode ray tube for example, commensurate with a series of different focal points of the scanning beam or beam penetration angles. The images may then later be compared to provide valuable information concerning the patient's condition. In the past it has been common practice to expose a series of plates and thereafter temporarily mount the plural individual negatives on a light box for comparison purposes. This, of course, is a cumbersome procedure which carries some risk that the order of presentation of negatives for review will be different from the order in which the exposures have been made.

There have been devices proposed in the prior art for forming multiple images on a single negative. Such prior art devices, however, have been primarily designed for recording data at the fastest possible speed and/or for maximizing "recall" speed. These prior art devices have typically established relative movement between the camera and film in a spiral pattern. Such prior art devices are not suitable for the recording of medical test data since they do not provide the degree of resolution required nor are they suitable for use in forming the comparatively large size individual images desired in the case of medical test data. Further, such prior art devices are customarily completely self-contained and thus are not capable of mounting on existing medical diagnostic equipment such as, for example, as a replacement for the single frame camera 34 of the ultrasonic body scanner of above-referenced U.S. Pat. No. 4,137,777.

SUMMARY OF THE INVENTION

The present invention overcomes the above briefly discussed and other deficiencies and disadvantages of the prior art by providing a novel transport mechanism for moving a film holder relative to a stationary lens and shutter mechanism. In accordance with the preferred embodiment, the transport mechanism is moved, in response to command signals delivered to stepping motors, relative to the transversely oriented axes of a cartesian coordinate system and the amount of movement of the film holder, i.e., the film cassette, in both the x and y directions is measured to provide cassette position information.

Apparatus in accordance with a preferred embodiment of the present invention comprises a film cassette transport support including a first pair of parallel guide rods. This first pair of guide rods are movably mounted on a second pair of parallel guide rods which are transversely oriented with respect to the guide rods of the first pair. A chain or belt drive, actuated by one of a pair of stepping motors, is affixed to the transport and movable transversely to the guide rods of the first pair. Operation of this first stepping motor will cause movement of the transport along the first guide rods.

Through use of a screw and nut assembly, motion produced by the second stepping motor is delivered to the guide rods of the first pair to cause these guide rods to move along the guide rods of the second pair. The guide rods of the second pair are affixed to a support having a window therein. The movement of the transport along the first guide rods and the transverse movement of the first guide rods along the second guide rods will index the transport relative to the window to permit areas of the film in the transport to be sequentially exposed.

BRIEF DESCRIPTION OF THE DRAWING

The present invention may be better understood and its numerous objects and advantages will become apparent to those skilled in the art by reference to the accompanying drawing wherein like reference numerals refer to like elements in the two FIGURES and in which:

FIG. 3 is a perspective view of the apparatus of FIG. 1 with the cover in place; and FIG. 4 is a partial cross-sectional side elevation view taken along line 4—4 of FIG. 3.

DESCRIPTION OF THE PREFERRED EMBODIMENT

Figure 1:
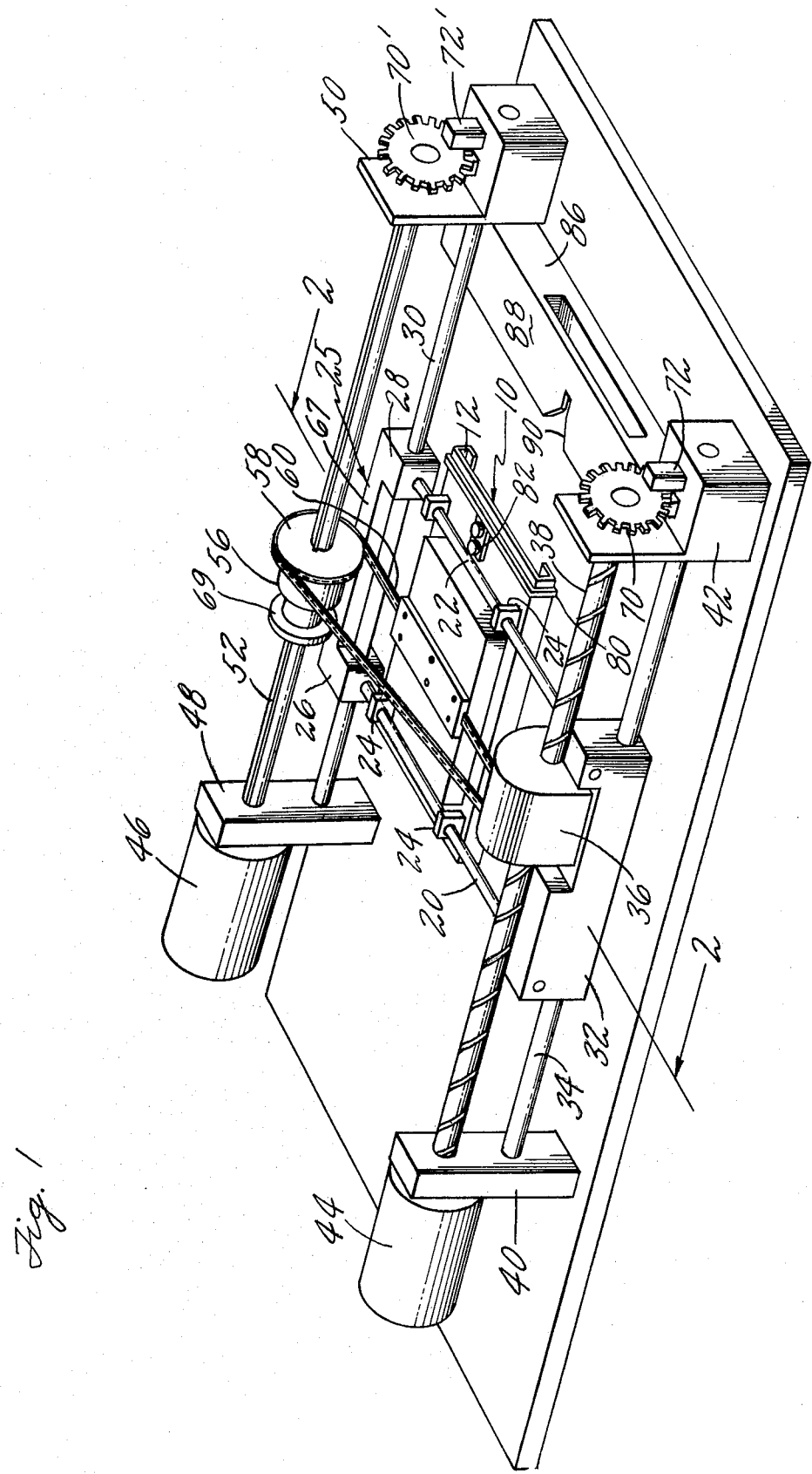
FIG. 1 is a perspective view of a film transport device, with cover removed, in accordance with a preferred embodiment of the present invention.

With reference now to the drawing, the movable holder or transport for a film cassette is indicated generally at 10. Transport 10 is provided with an access aperture 12 through which film cassettes, including a single unexposed "plate", may be loaded. The entire mechanism shown in the drawing will be installed within a light-proof housing. In use, the transport 10 will be driven to a "home" position and the film loaded via a door in the housing. The film cassette will be of conventional construction such that, after loading in transport 10, the film will be in position for exposure through the removal of a light shield.

Figure 2:
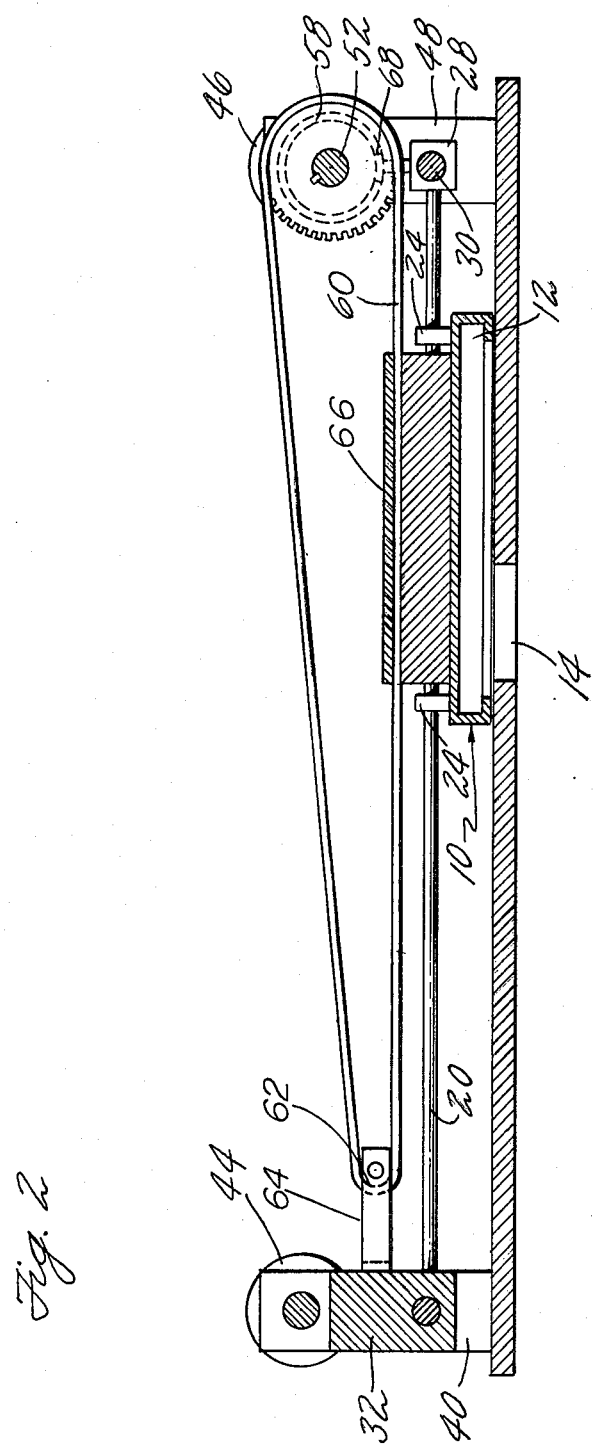
FIG. 2 is a cross-sectional side elevation view, taken along line 2—2, of the apparatus of FIG. 1.

Transport 10 is provided, in its lower side, with an opening through which the film may be exposed. During operation, in the manner to be described below, transport 10 is indexed relative to an opening 14 (see FIG. 2) in a base plate 16. The opening in base plate 16 will, with the apparatus installed on a piece of test equipment, be in registration with a lens and shutter assembly which forms the image to be recorded in the plane of the film. Means, including the position sensing apparatus to be described below, will be provided to prevent exposure of the film in transport 10 when the transport is moving between positions commensurate with the regions of the film to be serially exposed.

Transport 10 is suspended from a pair of parallel guide rods 20 and 22 by means of slide bearing blocks 24; the bearing blocks 24 being affixed to transport 10 in any suitable manner. This mounting technique permits transport 10 to be moved, in the manner to be described below, along the guide rods 20 and 22. Guide rods 20 and 22, at first ends thereof, are anchored in a first slide bearing assembly 25 which includes bearings 26 and 28. Bearings 26 and 28 are mounted on a guide rod 30 which is oriented transversely to rods 20 and 22. Bearing assembly 25 is, in the manner to be described below, movable along rod 30. Rods 20 and 22 are supported, at their second ends, in a further slide bearing assembly 32. Bearing assembly 32 is slidably supported on guide rod 34 which is parallel to guide rod 30. Also in the manner to be described below, the entire transport mechanism, including transport 10 and guide rods 20 and 22, may be moved along guide rods 30 and 34. Thus, the transport 10 is movable in two mutually transverse directions.

Considering first the movement of the transport along guide rods 30 and 34, which may be considered the y direction, a lead screw 38 is coupled to slide bearing assembly 32 by means of a roll nut assembly 36. The roll nut assembly 36 is affixed to slide bearing assembly 32 whereby the bearing assembly 32, and thus guide rods 20 and 22, will move with nut 36. The lead screw 38 is rotatably supported at its opposite ends by the same means which supports the rod 34; i.e., by means of a rear support bracket 40 and a front support bracket mechanism 42. Lead screw 38 is rotated by means of a first d.c. motor 44 and its associated gear box which are affixed to bracket 40. The operation of motor 44, whereby the output shaft of the motor is caused to rotate in either the clockwise or counterclockwise directions, will thus impart rotation to lead screw 38. Because of the interaction of lead screw 38 with nut 36, the film transport 10 will be moved in the y direction with the bearing assembly 25 sliding on guide rod 30 and bearing assembly 32 sliding on guide rod 34.

The means by which motion in the x direction is imparted to transport 10 includes a second d.c. motor 46 and its associated gear box. Motor 46 is mounted on a bracket 48 which also supports one end of guide rod 30. The opposite; i.e., the forward; end of guide rod 30 is supported by a bracket assembly 50. A spline shaft 52 is rotatably supported in brackets 48 and 50 and extends parallel to guide rod 30. Spline shaft 52 is coupled to the output member of motor 46 whereby operation of motor 46 will cause shaft 52 to rotate. A spline follower 56 is mounted on shaft 52 so as to be readily slidable along shaft 52 while also being rotatable with the spline shaft. A sprocket 58 is affixed to spline follower 56 for rotation therewith. Sprocket 58 engages a drive "chain" 60 which, as may best be seen from FIG. 2, also passes around an idler sprocket 62. Idler or driven sprocket 62 is supported on a bracket 64 which extends from slide bearing assembly 32. The drive "chain" 60 is fixed to transport 10 by means of a clamp member 66. A plurality of dowel pins, not shown, extend upwardly from the top of the transport 10 and engage "chain" 60. The clamp member 66 captures the "chain" by preventing the chain from lifting off the pins. Accordingly, when motor 46 is caused to rotate in either the clockwise or counterclockwise direction, sprocket 58 will rotate with spline shaft 52 thereby imparting movement to drive "chain" 60 and, via the chain, to transport 10 to cause the transport to slide along parallel guide rods 20 and 22.

The bearing assembly 25 includes a pin extending upwardly from the cross-member 67 which joins slide bearings 26 and 28. This pin supports a bearing 68 which is engaged in groove 69 of spline follower 56. The spline follower rotates on bearing 68 as the spline shaft turns. The follower 56 is driven along shaft 52 as the transport assembly moves along guide rods 30 and 34 as a result of the lateral forces delivered to the side walls of groove 69 by the bearing 68 as the slide bearing assembly 25 moves on guide rod 30.

In order to enable the position of transport 10 to be monitored, a position sensor is associated with each of lead screw 38 and spline shaft 52. In the disclosed embodiment identical photo electric sensors are employed although other types of sensors could be employed and both sensors do not have to be identical. These photo electric sensors each employ an encoder wheel 70. The encoder wheels 70 and 70' are positioned between light sources and respective photo cells 72 and 72'. In the manner known in the art, the photo cells will generate pulses as lead screw 38 and spline shaft 52 rotate. These pulses may be counted in control circuitry which is also responsive to the direction of rotation to determine the position, in the x and y coordinates, of transport 10. This position information is employed by the circuitry which generates the control signals for motors 44 and 46. For proper operation, it is necessary that transport 10 be returned to a "home" position for reloading fresh film. The signals provided by the photo cells 72 and 72' may also be employed to prevent the operator of the test apparatus with which the present invention is utilized from exposing the film during movement of transport 10.

Referring now to FIGS. 3 and 4, in order to load unexposed film in transport 10 and remove exposed film therefrom, a light-tight seal must be established about opening 12 when the transport is in the "home" position. This is accomplished by providing, on transport 10, a frame 80 which extends about opening 12, and a guide bearing 82. Bearing 82 is mounted so as to extend above frame 80. The housing, indicated generally at 84 in FIG. 3, is provided with a front plate 86 which has an opening therein which matches the opening 12 in transport 10. A gasket of felt or other suitable resilient material will extend about the inside of the opening in plate 86 so as to cooperate with frame 80, when the transport 10 is in the home position, to establish a light-tight seal.

A plate 88 is mounted above plate 86 and is provided with a guide slot 90 which receives bearing 82. When the transport 10 approaches the "home" position the bearing 82 will enter slot 90. Any slight misalignment of transport frame 80 with respect to the seal about the opening in plate 86 will be overcome as the bearing 82 moves to the bottom of slot 90 at which point frame 80 will contact and compress the seal.

When the transport is "home," the access door 92 in housing 84 may be opened and, if there is exposed film in transport 10, a light shield may be inserted in the film cassette and the cassette then removed from the apparatus. The door 92 will be provided with a sensor, a micro-switch for example, which will provide either a warning or a transport movement disabling signal whereby movement of the transport from the "home" position will be prevented when door 92 is open. Similarly, means will be provided to warn that the transport is not "home" to prevent opening of door 92 when the light-tight seal is not established about the opening 12.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. A transport mechanism for a recording medium comprising:
    means for receiving and holding a recording medium;
    means supporting said receiving means for linear motion in a first direction;
    means mounting said supporting means for linear motion in a second direction transverse to said first direction;
    a first stationary drive motor;
    drive belt means, said drive belt means being affixed to said receiving means;
    idler means for supporting said drive belt means at a point displaced in a first direction beyond a first limit of motion of said receiving means, said idler means being mounted from said supporting means for movement therewith;
    means for engaging and driving said drive belt means;
    a rotatable spline shaft, said spline shaft being driven by said first stationary motor, said drive belt means engaging means being mounted on said spline shaft for rotation therewith, said engaging means also being moveable in said second direction on said spline shaft;
    means supporting said spline shaft at points displaced in said second direction beyond the opposite limits of motion of said supporting means in said second direction; and
    means including a second stationary motor for imparting motion to said supporting means in the second direction independently of movement of said receiving means in said first direction.

2. The apparatus of claim 1 wherein said supporting means comprises:
    a first pair of parallel guide rods; and
    first bearing means mounted on said rods of said first pair for movement along said rods, said receiving means being affixed to said first bearing means whereby said receiving means is supported from and slidable with respect to said first rods and said first guide rods are coupled together by said bearing means and said receiving means.

3. The apparatus of claim 2 wherein said mounting means comprises:
    a second pair of parallel guide rods;
    means for supporting the guide rods of said second pair adjacent the opposite ends thereof, the guide rods of said second pair being respectively fixedly positioned adjacent the opposite ends of said guide rods of said first pair; and
    second bearing means coupling each of the ends of the guide rods of said first pair to a guide rod of the second pair, the guide rods of said first pair being slidable as a unit along the guide rods of said second pair on said second bearing means.

4. The apparatus of claim 3 wherein said means for imparting motion to said supporting means in the second direction comprises:
    screw means, said screw means being rotatably supported parallel to one of the guide rods of said second pair;
    said second stationary motor imparting rotation to said screw means;
    nut means, said nut means travelling on said screw means in response to rotation thereof by said second motor, said nut means being affixed to one of said second bearing means whereby the motion of said nut means will be delivered to said first guide rods via the said one of said second bearing means.

5. The apparatus of claim 1 wherein said engaging means comprises:
    follower means mounted on said spline shaft; and
    sprocket means affixed to said follower means.

6. The apparatus of claim 5 further comprising:
    rotation sensor means coupled to said screw means and said spline shaft, said rotation sensor means each including an encoder member rotatable with each of said screw means and spline shaft, said rotation sensor means further comprising means for sensing rotation of said screw and shaft mounted encoder members.

7. The apparatus of claim 5 further comprising:
    bearing means for coupling said spline shaft follower means to said first bearing means whereby said follower means will move along said spline shaft when said first bearing means moves on the guide rods of said first pair.

8. The apparatus of claim 1 wherein said receiving means supports a photographic film holder and said receiving means defines a window through which film in said holder may be exposed, and wherein said apparatus further comprises:
    a base plate, said mounting means being affixed to said base plate, said base plate defining an aperture smaller in size than said receiving means window, said receiving means being moved relative to said base plate aperture by said motion imparting means to permit serial exposure of portions of the film in said holder.

9. The apparatus of claim 7 wherein said receiving means supports a photographic film holder and said receiving means defines a window through which the film in said holder may be exposed, and wherein said apparatus further comprises:
    a base plate, said means for supporting said guide rods of said second pair being affixed to said base plate, said base plate defining an aperture smaller in size than said receiving means window, said receiving means being moved relative to said base plate aperture by said first and second stationary motors to permit serial exposure of portions of the film in said holder.

10. The apparatus of claim 7 wherein said receiving means supports a photographic film holder and said receiving means defines a window through which the film in said holder may be exposed, and wherein said apparatus further comprises:

a base plate, said means for supporting said guide rods of said second pair being affixed to said base plate, said base plate defining an aperture smaller in size than said receiving means window, said receiving means being moved relative to said base plate aperture by said first and second stationary motors to permit serial exposure of portions of the film in said holder.

11. A transport mechanism for a recording medium comprising:

a film cassette holder, said holder having an access opening in a first side thereof;

frame means extending about said holder adjacent to said access opening;

guide bearing means affixed to and extending from said holder;

means engaging said guide bearing means for supporting said holder for linear motion in a first direction;

means mounting said supporting means for linear motion in a second direction transverse to said first direction;

means including a first stationary motor for imparting motion to said holder in said first direction independent of movement of said supporting means in said second direction; and means including a second stationary motor for imparting motion to said supporting means in said second direction independently of movement of said holder in said first direction;

housing means, said holder and said supporting, mounting and motion imparting means being positioned within said housing means, said housing means including:

plate means for cooperating with said frame means to establish a light-tight seal about said holder access opening; and means defining a guide slot adjacent said plate means, said guide bearing means being received in said guide slot to establish said light-tight seal.

* * * * *